3,825,438
MANUFACTURE OF PIGMENTS
David William Pritchard, Teesside, and Thomas James Wiseman, Richmond, England, assignors to British Titan Limited, Billingham, Teesside, England
No Drawing. Filed Apr. 25, 1972, Ser. No. 247,337
Claims priority, application Great Britain, Apr. 28, 1971, 11,824/71
Int. Cl. B44d 1/02
U.S. Cl. 117—100 B                                    11 Claims

ABSTRACT OF THE DISCLOSURE

A process for coating titanium dioxide pigment with at least one hydrous oxide of a metal by mixing an aqueous dispersion of the pigment with at least one water-soluble hydrolysable compound of a metal and precipitating a hydrous oxide on to the pigment in the presence of an alcohol and/or a carboxylic acid, each of which contains at least two or more hydroxy groups.

---

This invention relates to a method of coating titanium dioxide pigments with hydrous oxides.

According to the present invention a process for coating titanium dioxide pigment with at least one hydrous oxide of a metal comprises mixing an aqueous dispersion of a titanium dioxide pigment with at least one water-soluble hydrolysable compound of a metal and precipitating a hydrous oxide of the metal on to the surface of the particles of titanium dioxide in the presence of an alcohol and/or a carboxylic acid, said alcohol and said acid each containing two or more hydroxy groups.

In the process of the present invention titanium dioxide pigment is coated with one or more hydrous oxides in the presence of a polyhydric alcohol and/or a carboxylic acid. The alcohol and the acid each contain at least two hydroxy groups and for the purpose of this specification the term "hydroxy group" includes that present in a carboxyl group. The process results in titanium dioxide pigment having an improved dispersibility when compared with a pigment coated in the absence of the alcohol or carboxylic acid. In addition the treatment substantially prevents the deterioration in dispersibility which otherwise frequently occurs on storage prior to use, e.g. in a warehouse. This latter property is particularly important since it is usual to store pigments in bags, often under the applied load of other bags, for sometime prior to them being used. In addition one or more of the gloss, hiding power, stoving colour and drying time of these treated pigments are usually improved by the coating in the presence of the said alcohol and/or said carboxylic acid.

The hydrous oxide of a metal can be any one of the usual hydrous oxides known for treatment of titanium dioxide pigments and examples of suitable hydrous oxides are those of aluminium, titanium, cerium, zirconium, silicon and zinc. For the purposes of this specification the term "metal" is taken to include silicon and also the term "hydrous oxide" is taken to include the an "aluminosilicate" since when a coating is deposited from an aluminium salt and a silicate it is difficult to known exactly the form of the deposited coating. Two or more different hydrous oxides can be deposited if desired.

Any suitable water-soluble hydrolysable salt may be used to deposit the hydrous oxide. For instance, aluminium sulphate, aluminium nitrate, aluminium chloride, titanyl sulphate, titanium tetrachloride, zirconium sulphate, zirconium oxychloride cerium sulphate or zinc sulphate can be used or alternatively an alkali metal aluminate e.g. sodium aluminate can be employed. Water-soluble silicates such as alkali metal silicates e.g. sodium silicate can be used as the source of the hydrous silica.

The amount of the hydrous oxide deposited can vary over wide limits and usually the amount will be at least 0.05% by weight of the hydrous oxide expressed as the oxide and based on the weight of $TiO_2$. Typically the amount of each hydrous oxide deposited can be up to 15% by weight (expressed as oxide) on $TiO_2$.

The water-soluble salt or compound can be mixed with an aqueous dispersion of the titanium dioxide pigment in the solid state or preferably as an aqueous solution. Usually the coating process is operated in a batchwise manner but if desired the process can be operated continuously with the coating reagents being added to a continuous flowing stream of the aqueous dispersion of the titanium dioxide pigment.

After the addition of the coating reagents the pH of the aqueous dispersion is changed to effect the precipitation of the desired hydrous oxide(s). When the coating reagent products, on addition to the aqueous dispersion, an acid pH then it is necessary to add an alkali to effect the precipitation and an acid when the coating reagents produce an alkaline pH. However, if desired an acid reacting coating reagent and a basic reacting coating reagent can be added to effect the precipitation of the coating oxides without any separate addition of acid or alkali.

The precipitation of the hydrous metal oxide coating is effected in the presence of an alcohol and/or a hydroxy carboxylic acid containing two or more hydroxy groups.

The alcohols which can be used are the polyhydric alcohols i.e. alcohols containing two or more hydroxy groups. Typical alcohols are the dihydric alcohols such as the glycols e.g. ethylene glycol, propylene glycol (1,2 propane diol), butylene glycol, 1,3 propane diol (trimethylene glycol), 1,3 amyl diol and hexane 1,3 diol. Preferably the polyhydric alcohol is a trihydric alcohol and a particularly useful trihydric alcohol is glycerol (1, 2,3 propane triol). Usually the polyhydric alcohol contains from 2 to 8 carbon atoms, preferably 3 to 7 carbon atoms.

The carboxylic acid which can be used instead of or in addition to the polyhydric alcohol usually contains at least two carboxyl groups. However, the acid contains only one carboxyl group and at least one other hydroxy group. Examples of suitable acids that can be used are oxalic acid, citric acid, tartaric acid and tricarballylic acid. Usually the acid will contan at least 2 carbon atoms in the molecule and can conveniently contain up to 15 carbon atoms.

The alcohol and/or the acid should preferably have a high solubility in water to enable intimate contact to be achieved between the titanium dioxide pigment and the alcohol and/or acid.

Usually the amount of the alcohol and/or acid that is used will be from 0.01 to 5% by weight based on the weight of $TiO_2$. Preferably the amount of the alcohol and/or acid will be from 0.01 to 1% by weight based on the weight of $TiO_2$.

The alcohol and/or the acid can be added to the titanium dioxide pigment at any convenient stage but prior to the completion of the deposition of the coating. In practice this means that the alcohol and/or acid is added to the aqueous dispersion of titanium dioxide pigment prior to the complete addition of an acidic or alkaline reacting material which is normally necessary to effect the required change in pH to precipitate the hydrous oxide(s). The alcohol or acid can be added prior to the addition of any coating reagents but it is usually added after the addition of coating reagents and prior to the completion of the addition of the acidic or alkaline reacting material. In the case where one of the coating reagents is itself the acidic or alkaline reacting material the alcohol or acid is added prior to the coating reagent.

After the deposition of the hydrous oxides(s) the pigment is usually filtered, washed and finally fluid energy milled.

The products of the process of the present invention can be used in a wide variety of products e.g. paints, plastics, fibres and paper. The products are particularly useful when used in oleoresinous paints in which the ease of dispersion with freedom from grits is particularly noticeable even after lengthy storage.

The invention is illustrated in the following Examples.

EXAMPLE 1

An aqueous slurry of rutile titanium dioxide containing 200 grams per litre $TiO_2$ and sodium silicate as a dispersant in an amount equivalent to 0.7% by weight $SiO_2$ and $TiO_2$ was milled.

To the milled slurry there was added sodium silicate in an amount equivalent to 0.45% by weight $SiO_2$ on $TiO_2$ and the slurry whilst being stirred was heated to 40° C. At this temperature a mixed solution of titanyl sulphate and aluminium sulphate was added. The mixed solution contained titanyl sulphate and aluminium sulphate in respective amounts expressed as the oxides of 53.4 g.p.l. $TiO_2$ and 71.0 g.p.l. $Al_2O_3$ and the amount of the mixed solution added was such as to introduce aluminium sulphate in a nominal amount of 2% by weight (as $Al_2O_3$) as shown in the following table. The pH of the slurry was 1.8.

The slurry was stirred for a further 15 minutes and sodium silicate was added in an amount equivalent to 0.25% by weight $SiO_2$ on $TiO_2$ and the slurry stirred for a further 15 minutes.

The temperature of the slurry was raised to 50° C. and glycerol or tartaric acid in an amount as shown in the following table was added after which the slurry was stirred for 10 minutes. To the slurry was then added sodium hydroxide solution containing 110 grams NaOH per litre in an amount sufficient to raise the pH to 8.5. The slurry was then stirred for 30 minutes and then the coated pigment filtered, washed, repulped, washed and dried at 110° C. Finally the pigment was fluid energy milled in a laboratory fluid energy mill.

The pigment was incorporated into an alkyd resin paint, dried at 120° C. and the gloss determined using a 45° gloss meter to give the percent reflectance in the usual manner. The results are shown in the following Table 1.

TABLE 1

| Sample | Percent $Al_2O_3$ | Percent glycerol | Gloss |
|---|---|---|---|
| | W./w. $TiO_2$ | | |
| 1 | 1.91 | | 88.5 |
| 2 | 1.79 | 5 | 95.5 |
| 3 | 1.75 | 3.5 | 95.0 |
| 4 | 1.93 | 2.0 | 92.5 |
| 5 | 1.87 | 0.5 | 91.0 |
| | | Percent tartaric acid w./w. $TiO_2$ | |
| 6 | 2.11 | | 90.5 |
| 7 | 2.04 | 0.2 | 92.5 |

The results show the improvements obtained in the gloss.

EXAMPLE 2

The procedure for coating a rutile titanium dioxide pigment described in Example 1 was repeated except for: using 150 kilograms of the slurry which contained sodium silicate in an amount equivalent to 0.8% by weight on $TiO_2$ as dispersant; heating the slurry to 40° C. before adding sodium silicate in an amount of 0.36% as $SiO_2$ on $TiO_2$ instead of 0.45% $SiO_2$; finally adding sodium silicate in an amount of 0.19% $SiO_2$ on $TiO_2$ instead of 0.25% $SiO_2$; the amount of glycerol was 0.5% w./w. $TiO_2$.

The experiment was repeated with no glycerol addition to produce the control.

The pigments were tested for their ease of dispersibility by incorporating in a mil-base of the following composition:

|   | Grams |
|---|---|
| Alkyd resin solution (40% solution in white spirit) sold by Beck-Koller under No. P470 | 90 |
| Pigment | 248 | and milling in a high speed mixer for 6 minutes and then adding a further 30 grams of the resin solution and finally milling for 5½ minutes. The resulting paints were tested using Hegman gauges and the readings obtained are given below in Table 2.

TABLE 2

| Glycerol amount percent w./w. $TiO_2$: | Hegman Gauge Reading |
|---|---|
| None | 6¾–3¾ |
| 0.5 | 7–5 |

The first value of the result gives the position on the scale when the surface is almost wholly composed of grits and the second value gives the position on the scale where grits are first noticed. The higher the readings the easier is the pigment to disperse for a given milling time.

The two pigments were stored in 25 kilo bags in a warehouse under accelerated storage conditions equivalent to 1 year's storage in a warehouse stack and the dispersibility again tested. The pigment having a coating deposited in the presence of glycerol had the same Hegman Gauge Reading as before storage while the control pigment had a reading of 5½–<1. Those results showed no deterioration on storage for the pigment prepared according to the invention.

EXAMPLE 3

An aqueous slurry containing 700 gms. $TiO_2$/litre and sodium silicate (1.6% $SiO_2$ based on $TiO_2$) as dispersant was sand milled and then diluted to 220 gms. $TiO_2$/liter. The amount of the aqueous slurry was sufficient to contain 2 kg. of $TiO_2$.

The milled slurry was heated to 40° C. and whilst being maintained at this temperature, a mixed solution of titanyl sulphate and aluminium sulphate was added over 10 minutes. The titanyl sulphate/aluminium sulphate solution contained 46.65 g./l. $TiO_2$ and 78.00 g./l. $Al_2O_3$ and the total amount added was sufficient to contain 2.45% $Al_2O_3$ on $TiO_2$. The mixture was heated to 50° C. and stirred at this temperature for 20 minutes, then the pH of the mixture was raised to pH 8 over 40 minutes using 110 g./l. NaOH. The mixture was stirred at 50° C. for 20 minutes then filtered and the product washed and then dried at 110° C. Finally, the pigment was milled in a laboratory fluid energy mill at a feed rate of 25 g. pigment/minute.

The pigment was prepared with various organic acids and alcohols added at various stages during the coating, as shown in Table 3.

The warehousing behaviour of the pigments so prepared were examined by submitting samples to a laboratory accelerated warehousing test. The pigment under test was placed in paper bags, and these bags were placed in a stack under a 250 lb. lead weight. The stack was contained within a perspex cabinet where the relative humidity was maintained at 98% by means of saturated copper sulphate solution.

The stored pigments were tested for their ease of dispersibility by incorporation of the pigment in a paint and examination of the particle size range in the paint by means of a Braive Gauge. The Braive Gauge is a steel block having a sloping groove down one face which is calibrated in microns showing the size of pigment particles.

The paint was prepared by mixing 2.48 g. of pigment with 90 g. of 40% resin solution (40% solution of Beckosol P470 in High Flash White Spirit) using a high speed impeller for 6 minutes. A further 30 g. of resin solution was then added and the mixture was milled for a further 30 seconds. To 170 g. of this mill base was added 132 g. of 70% resin solution, 15 g. of high flash white spirit, and 11.5 cm.$^3$ of naphthanate driers (containing 0.005 g. Co, 0.05 g. Pb and 0.01 g. Ca). The paint was then mixed for 15 minutes and allowed to deaerate for 1 hour.

The Braive Gauge readings for the pigments under test and those of a pigment coated in the absence of an organic additive are shown in Table 3. The accelerated warehousing test when carried out for 7 days is equivalent to conventional storage in a warehouse for 16 weeks.

The first Braive Gauge reading gives the maximum size in microns of the majority of the particles of pigment and the second reading gives the approximate maximum size of the remaining particles or grits.

TABLE 3

| Pigment description | Braive gauge readings (microns) after storage for— | | | |
|---|---|---|---|---|
| | No storage | 9 days | 15 days | 22 days |
| Unadditioned | 9–19 | 12–24 | 15–28 | 18–36 |
| 0.4% Trimellitic anhydride added after titanyl sulphate/aluminium sulphate solution | 9–18 | 10–20 | 11–24 | 11–24 |
| 0.4% Citric acid | 10–17 | 9–17 | 10–21 | 13–27 |
| 0.1% DL serine | 9–17 | 10–18 | 11–31 | 10–21 |
| 0.4% Glycollic acid | 8–16 | 10–19 | 12–20 | 15–27 |
| 0.4% Trimesic acid | 8–17 | 9–18 | 12–31 | 16–32 |
| 0.4% Naphthalene 1,4,5,8 tetracarboxylic acid | 9–18 | 10–23 | 13–25 | 14–28 |
| 0.4% Butane 1,4-diol | 12–24 | 12–26 | 12–26 | 13–26 |
| 0.4% Propane 1,3-diol | 7–14 | 8–16 | 9–19 | 10–20 |
| 0.4% Trimethylolethane | 10–20 | 10–21 | 10–21 | 11–25 |
| 0.4% Triethylene glycol | 12–20 | 10–22 | 12–23 | 13–25 |

In the above Table, the addition of trimellitic anhydride was made before addition of caustic soda solution whereas the remaining were added after 75% of the caustic soda solution had been added.

These results show quite clearly that the pigment of the invention retained its dispersibility on storage much better than the control pigment.

EXAMPLE 4

A similar coating procedure to that of Example 3 was followed except that 100 kg. of TiO$_2$ were used. The final pigment was fluid energy milled in 15 inch steam fluid energy mills using a steam to pigment ratio of 3/1 wt./wt. The steam used was superheated at 270° C.

The change in pigment dispersibility after warehousing was measured in the same way as in Example 3 and the results are shown in Table 4.

TABLE 4

| Expt. No. | Pigment description | Braive gauge reading (microns) after storage for— | | | |
|---|---|---|---|---|---|
| | | No storage | 10 days | 16 days | 30 days |
| 1 | Unadditioned | 10–16 | 16–34 | 18–36 | 19–40 |
| 2 | 0.4% Phthalic acid | 11–19 | 12–22 | 12–24 | 14–30 |
| 3 | 0.4% Tartaric acid | 12–23 | 12–24 | 14–26 | 16–30 |
| 4 | 0.4% Glycerol | 9–17 | 9–16 | 10–19 | 10–18 |
| 5 | do | 8–16 | 14–28 | 16–30 | 16–34 |
| 6 | 0.4% Adipic acid | 9–17 | 10–18 | 12–24 | 12–27 |
| 7 | 0.4% Trimellitic acid | 7–13 | 13–28 | 14–30 | 15–32 |

In Experiments 2, 3, 4 and 7 in the above Table, phthalic acid, tartaric acid, glycerol and trimellitic acid were all added after 75% of the caustic soda solution had been added. In Experiments 5 and 6, the glycerol and adipic acid were added before the titanyl sulphate/aluminium sulphate solution.

EXAMPLE 5

Dry milled rutile titanium dioxide produced commercially by the sulphate process was washed on a rotary filter with water at 60° C. until the total soluble salts content was reduced to 0.05%. The TiO$_2$ was then dispersed in water at 900 g./l. with 0.15% monoisopropanolamine and 0.10% SiO$_2$ (as Sodium Silicate). The dispersion was then sand milled.

To the sand milled slurry was added a solution containing titanyl sulphate and aluminium sulphate, to give 1.5% TiO$_2$ and 2% Al$_2$O$_3$ based upon titanium dioxide, followed by sodium silicate to give 0.75% SiO$_2$ based upon titanium dioxide. The mixture was heated to 60° C., neutralised to pH 7.5 over 40 minutes, allowed to stir for 40 minutes, filtered washed and then dried at 110° C. The dried pigment was fluid energy milled in a 30 inch factory fluid energy mill at a steam pigment ratio of 1:1. The preparation was then repeated, and 0.5% glycerol based upon titanium dioxide added after aluminium sulphate/titanyl sulphate solution.

Different samples of unadditioned and glycerol additioned pigments were stored in a normal warehouse, and the change in dispersibilities noted by measuring pI values of a paint.

pI values were determined by counting the number of particles protruding above a made up paint film of 21 μm. thickness. Assessment is by means of comparison with standard panels viewed under reflected light. If there are $2^N$ particles per cm.$^2$, the pI rating will be N.

The paint films were prepared by mixing 60 g. of the pigment under test and 130 g. of resin solution (80 g. of alkyd resin Paralac 10 W dissolved in High Flash White Spirit—50 g.) for 10 minutes with a high speed stirrer. An 11 cm.$^3$ paint sample was taken and mixed with 0.25 cm.$^3$ of driers (containing lead and cobalt naphthenates and having 0.0071 g. Co and 0.071 g. Pb per cm.$^3$) and poured onto a glass plate. The glass plate was spun on a spinning table for 10 seconds known to give a film thickness of 21 μm., and then allowed to dry horizontally at room temperature overnight.

The results of the tests are shown in Table 5 below:

TABLE 5

| Storage period | pI values | | | |
|---|---|---|---|---|
| | 8 weeks | 14 weeks | 18 weeks | 20 weeks |
| Unadditioned material: | | | | |
| Initial | 2 | 3 | 2½ | 2½ |
| After storage | 3 | 4 | 6 | 6½ |
| 0.5% Glycerol additioned: | | | | |
| Initial | 2½ | 2½ | 3 | 2½ |
| After storage | 2 | 3 | 3 | 3 |

EXAMPLE 6

Dry milled rutile TiO$_2$ as in Example 5 was sand milled with sodium silicate (0.8% SiO$_2$ based upon TiO$_2$) and then diluted to give a slurry containing 220 g. TiO$_2$/l. To this slurry at 40° C. was added aluminium sulphate/titanyl sulphate solution (having 78 g./l. Al$_2$O$_3$ and 47 g./l. TiO$_2$) to give 2.45% Al$_2$O$_3$ based upon the weight of TiO$_2$. After 20 minutes mixing, sodium silicate (95 g./l. SiO$_2$) was added to give a 0.55% SiO$_2$ coating based upon the weight of TiO$_2$, whilst the temperature was raised to 50° C. After 20 minutes mixing, soda ash solution (180 g./l. Na$_2$CO$_3$) was added to neutralise to pH 7.2. The mixture was filtered, washed, and then dried at 110° C. Additions of glycerol and tartaric acid were made over the 15 minutes just prior to additions of soda ash solution. Pigment dispersibilities are assessed as described previously in Example 3. Because there were variations in plant processing conditions final product dispersibilities varied over a range, thus a series of results is given from samples taken from every 5 tons batches.

The results are given below in Table 6.

TABLE 6

| Pigment description | Initial Braive gauge readings (microns) |
|---|---|
| Unadditioned | 11–22 |
|  | 14–32 |
|  | 12–25 |
|  | 17–39 |
| 0.5% Glycerol addition | 8–13 |
|  | 10–15 |
|  | 11–26 |
|  | 6–11 |
|  | 10–14 |
|  | 8–13 |
|  | 10–17 |
|  | 9–12 |
|  | 9–11 |
| 0.05% Tartaric acid addition | 8–14 |
|  | 11–19 |
|  | 7–11 |
|  | 11–27 |
|  | 8–12 |
|  | 10–18 |
|  | 11–17 |
|  | 8–11 |
|  | 8–14 |
|  | 10–17 |
|  | 10–15 |
|  | 8–13 |
|  | 8–12 |

What is claimed is:

1. A process for coating titanium dioxide pigments with at least one hydrous oxide of a metal which comprises mixing an aqueous dispersion of a titanium dioxide pigment with at least one water soluble hydrolysable compound of a metal selected from the group consisting of aluminum, titanium, cerium, zirconium, silicon and zinc, adding to the dispersion a polyhydric alcohol containing at least two hydroxy groups, said alcohol containing from 2 to 8 carbon atoms, and precipitating a hydrous oxide of the metal onto the surface of the particles of titanium dioxide by effecting a change in the pH of the dispersion.

2. A process according to claim 1 in which the water-soluble compound of a metal is used in an amount sufficient to provide at least 0.05% by weight of the hydrous oxide expressed as the metal oxide based on the weight of $TiO_2$.

3. A process according to claim 2 in which the amount of the water-soluble compound of a metal is sufficient to provide up to 15% of the particular hydrous oxide, expressed as the metal oxide based on the weight of $TiO_2$.

4. A process according to claim 1 in which the alcohol contains from 3 to 7 carbon atoms.

5. A process according to claim 1 in which the alcohol contains two hydroxy groups.

6. A process according to claim 1 in which the alcohol contains three hydroxy groups.

7. A process according to claim 1 in which the amount of the alcohol is from 0.01% to 5% by weight based on the weight of $TiO_2$.

8. A process according to claim 7 in which the amount of the alcohol is from 0.01% to 1% by weight based on the weight of $TiO_2$.

9. A process according to claim 1 in which an acid or alkali is added to the aqueous suspension to effect a change of pH to precipitate the desired hydrous oxide.

10. A process according to claim 9 in which the alcohol is added to the aqueous dispersion prior to the addition of the acid or alkali.

11. A process according to claim 9 in which the alcohol is added to the aqueous dispersion before the complete addition of the acid or alkali.

References Cited

UNITED STATES PATENTS

| 3,172,772 | 3/1965 | Rowe | 106—300 |
| 3,522,079 | 7/1970 | Wiseman | 117—100 B |
| 3,663,284 | 5/1972 | Stanicoff et al. | 106—300 |
| 3,459,575 | 8/1969 | Andrew et al. | 106—300 |

FOREIGN PATENTS

| 1,247,514 | 8/1967 | Germany | 160—300 |

WILLIAM D. MARTIN, Primary Examiner

D. C. KONOPACKI, Assistant Examiner

U.S. Cl. X.R.

106—300, 308 B